United States Patent
Willms et al.

(10) Patent No.: US 12,162,808 B2
(45) Date of Patent: Dec. 10, 2024

(54) COOLER FOR COOLING CLINKER AND METHOD FOR OPERATING A COOLER FOR COOLING CLINKER

(71) Applicants: THYSSENKRUPP INDUSTRIAL SOLUTIONS AG, Essen (DE); thyssenkrupp AG, Essen (DE)

(72) Inventors: Eike Willms, Dortmund (DE); Ines Veckenstedt, Rietberg (DE); Reinhard Teutenberg, Unna (DE)

(73) Assignees: thyssenkrupp Polysius GmbH, Beckum (DE); thyssenkrupp AG, Essen (DE)

( * ) Notice: Subject to any disclaimer, the term of this patent is extended or adjusted under 35 U.S.C. 154(b) by 768 days.

(21) Appl. No.: 17/269,015

(22) PCT Filed: Sep. 6, 2019

(86) PCT No.: PCT/EP2019/073868
§ 371 (c)(1),
(2) Date: Feb. 17, 2021

(87) PCT Pub. No.: WO2020/053100
PCT Pub. Date: Mar. 19, 2020

(65) Prior Publication Data
US 2021/0323864 A1 Oct. 21, 2021

(30) Foreign Application Priority Data
Sep. 10, 2018 (DE) ...................... 10 2018 215 348.5

(51) Int. Cl.
*C04B 7/47* (2006.01)
*F27D 15/02* (2006.01)
(Continued)

(52) U.S. Cl.
CPC ............ *C04B 7/47* (2013.01); *F27D 15/0213* (2013.01); *F27D 21/0014* (2013.01);
(Continued)

(58) Field of Classification Search
CPC ... C04B 7/47; F27D 15/0213; F27D 21/0014; F27D 2019/0003; F27D 2019/0056; F27D 2019/0059
See application file for complete search history.

(56) References Cited

U.S. PATENT DOCUMENTS 2,199,945 A * 5/1940 Archer .................... C10B 39/02
  202/230
2,793,020 A * 5/1957 Puerner .................. F27B 7/383
  432/78
(Continued)

FOREIGN PATENT DOCUMENTS

CA  2154292 A1 * 12/1996
CA  2164150 C  *  2/2001 ............... C04B 7/02
(Continued)

OTHER PUBLICATIONS

English Translation of International Search Report issued in PCT/EP2019/073868, dated Nov. 4, 2019.

*Primary Examiner* — Ljiljana V. Ciric
(74) *Attorney, Agent, or Firm* — thyssenkrupp North America, LLC

(57) ABSTRACT

A cooler for a cooling clinker of a cement production plant includes an aeration grate for conveying the clinker in a conveying direction, a ventilator for generating a cooling air flow that passes the aeration grate as a cross flow, and a measuring plane disposed above the aeration grate. The measuring plane includes a temperature measuring installation for ascertaining a temperature distribution in the measuring plane. The cooler includes an open-loop or closed-loop control installation to control a conveying rate of the
(Continued)

clinker and/or a flow rate of the cooling air flow as a function of the ascertained temperature distribution. Further, a corresponding method can be utilized to operate a cooler for cooling clinker.

17 Claims, 1 Drawing Sheet

(51) Int. Cl.
  *F27D 19/00* (2006.01)
  *F27D 21/00* (2006.01)

(52) U.S. Cl.
  CPC ............... *F27D 2019/0003* (2013.01); *F27D 2019/0056* (2013.01); *F27D 2019/0059* (2013.01)

(56) References Cited

U.S. PATENT DOCUMENTS

| | | | | |
|---|---|---|---|---|
| 2,879,983 A * | 3/1959 | Sylvest | F27D 15/0213 | 432/78 |
| 3,079,701 A * | 3/1963 | Helming | F27D 15/0266 | 34/217 |
| 3,208,741 A * | 9/1965 | Wilhelm | F27D 19/00 | 700/282 |
| 3,276,755 A * | 10/1966 | Bast | F27D 19/00 | 432/24 |
| 3,302,938 A * | 2/1967 | Bendy | F27D 3/18 | 106/770 |
| 3,304,619 A * | 2/1967 | Futer | F28C 3/16 | 432/24 |
| 3,398,942 A * | 8/1968 | Foeg | F28C 3/16 | 34/89 |
| 3,469,828 A * | 9/1969 | Lane | F27B 7/42 | 432/67 |
| 3,485,192 A * | 12/1969 | Decker | G05D 7/0676 | 110/189 |
| 3,595,543 A * | 7/1971 | Tresouthick | F27B 7/42 | 106/750 |
| 3,686,773 A * | 8/1972 | Schreiner | F27D 15/0213 | 432/80 |
| 3,704,525 A * | 12/1972 | Devel | F27D 15/0213 | 432/80 |
| 3,831,291 A * | 8/1974 | Kayatz | C04B 7/47 | 432/78 |
| 3,836,321 A * | 9/1974 | Kobayashi | B01J 8/40 | 432/15 |
| 3,839,803 A * | 10/1974 | Dick | F27D 15/0213 | 432/78 |
| 3,922,797 A * | 12/1975 | Dick | F27D 15/0213 | 432/78 |
| 3,995,568 A * | 12/1976 | Dvirka | F23G 5/002 | 110/215 |
| 4,101,337 A * | 7/1978 | Dano | C04B 7/47 | 106/750 |
| 4,457,081 A * | 7/1984 | von Wedel | F27D 15/0213 | 34/430 |
| 4,509,917 A * | 4/1985 | Ubert | C04B 7/47 | 110/255 |
| 4,569,437 A * | 2/1986 | Doerges | F23H 17/00 | 110/328 |
| 4,624,636 A * | 11/1986 | Willis | F27B 7/383 | 432/78 |
| 4,680,009 A * | 7/1987 | Ernst | C21B 13/08 | 432/79 |
| 4,732,561 A * | 3/1988 | Eiring | B01J 8/44 | 110/291 |
| 4,762,489 A * | 8/1988 | Schmits | F27D 15/0213 | 432/83 |
| 4,838,183 A * | 6/1989 | Tsaveras | F23G 5/50 | 236/14 |
| 4,870,912 A * | 10/1989 | Lee | F23N 1/022 | 110/190 |
| 5,129,820 A * | 7/1992 | Kupper | C04B 7/47 | 432/78 |
| 5,149,266 A * | 9/1992 | Heinemann | F27D 15/0213 | 62/57 |
| 5,356,220 A * | 10/1994 | Iida | C21B 7/24 | 374/161 |
| 5,476,377 A * | 12/1995 | Kupper | C04B 7/47 | 432/78 |
| 5,549,471 A * | 8/1996 | Tegtmeier | F27D 15/022 | 432/83 |
| 5,572,937 A * | 11/1996 | Tegtmeier | F27D 15/0213 | 110/298 |
| 5,618,104 A * | 4/1997 | Koeberer | C04B 7/47 | 366/7 |
| 5,636,982 A * | 6/1997 | Santschi | F27D 15/0213 | 432/83 |
| 5,715,687 A * | 2/1998 | Nienaber | F27D 15/0213 | 62/57 |
| 5,759,026 A * | 6/1998 | von Wedel | F27D 15/0213 | 34/168 |
| 5,775,891 A * | 7/1998 | Klintworth | C04B 7/47 | 432/78 |
| 5,833,453 A * | 11/1998 | Doumet | C04B 7/47 | 432/78 |
| 5,890,888 A * | 4/1999 | Enkegaard | F27D 15/0266 | 432/78 |
| 5,895,213 A * | 4/1999 | Sutoh | C04B 7/47 | 110/282 |
| 6,312,253 B1 * | 11/2001 | Fons | F27D 15/0213 | 432/78 |
| 6,628,568 B1 * | 9/2003 | Mahler | H04R 29/001 | 367/13 |
| 6,796,141 B2 | 9/2004 | Kaestingschaefer | | |
| 6,920,702 B2 * | 7/2005 | Meyer | B65G 25/00 | 34/236 |
| 7,434,332 B2 * | 10/2008 | Morton | C10L 5/44 | 34/469 |
| 7,832,342 B2 * | 11/2010 | Martin | F23N 5/006 | 110/204 |
| 7,845,291 B2 * | 12/2010 | Mercx | F23G 5/50 | 110/235 |
| 8,309,045 B2 * | 11/2012 | Zhang | F01N 3/208 | 422/177 |
| 8,894,410 B2 * | 11/2014 | Cedergaard | F26B 25/10 | 110/288 |
| 9,605,902 B2 * | 3/2017 | von Wedel | F27D 15/022 |
| 10,041,682 B1 * | 8/2018 | Myers | F23L 9/02 |
| 10,131,576 B2 * | 11/2018 | Komatsu | C04B 7/434 |
| 10,180,254 B2 * | 1/2019 | Brennwald | F23H 7/04 |
| 10,386,064 B2 * | 8/2019 | Mawatari | F23J 15/003 |
| 10,816,197 B2 * | 10/2020 | Lucas | F23G 5/444 |
| 2008/0187876 A1 | 8/2008 | Mersmann | | |
| 2013/0017504 A1 * | 1/2013 | Yoo | H01L 21/67248 | 432/49 |
| 2020/0182462 A1 * | 6/2020 | Lucas | F23G 5/50 |

FOREIGN PATENT DOCUMENTS

| | | | | |
|---|---|---|---|---|
| CN | 1155877 A * | 7/1997 | ............... | C04B 7/47 |
| DE | 10 2004 054 417 A | 5/2006 | | |
| DE | 202006011213 U1 * | 12/2007 | ............... | F27B 7/383 |
| DE | 3916255 C3 * | 12/2009 | | |
| DE | 100 18 142 B | 1/2011 | | |
| DE | 102014100378 B3 * | 4/2015 | | |
| DE | 202015106820 U1 * | 3/2016 | ............... | F23J 3/02 |
| DE | 102018202063 A1 * | 8/2019 | ............... | F27B 7/2033 |
| DE | 102018215348 A1 * | 3/2020 | ............... | C04B 7/47 |
| DE | 102019215771 A1 * | 4/2021 | | |
| EP | 0 442 129 A | 8/1991 | | |
| EP | 1 475 594 A | 11/2004 | | |
| EP | 1788306 B1 * | 2/2012 | ............... | F23G 5/50 |
| EP | 2290311 B1 * | 7/2014 | ............... | B65G 25/00 |
| EP | 3749906 B1 * | 9/2021 | ............... | F27B 7/2033 |
| GB | 1395860 A * | 5/1975 | ............... | F27D 15/0213 |
| GB | 1566317 A * | 4/1980 | ............... | B08B 15/02 |

(56) References Cited

FOREIGN PATENT DOCUMENTS

| | | | | |
|---|---|---|---|---|
| IT | 1183991 | B * | 10/1987 | ............... C04B 7/47 |
| KR | 970010803 | B1 * | 7/1997 | |
| KR | 100236796 | B1 * | 1/2000 | |
| KR | 101184966 | B1 * | 10/2012 | |
| RS | 63626 | B1 * | 10/2022 | |
| RS | 63655 | B1 * | 11/2022 | |
| WO | WO-2019154723 | A1 * | 8/2019 | ............ F27B 7/2033 |
| WO | WO-2020053100 | A1 * | 3/2020 | ............... C04B 7/47 |

* cited by examiner

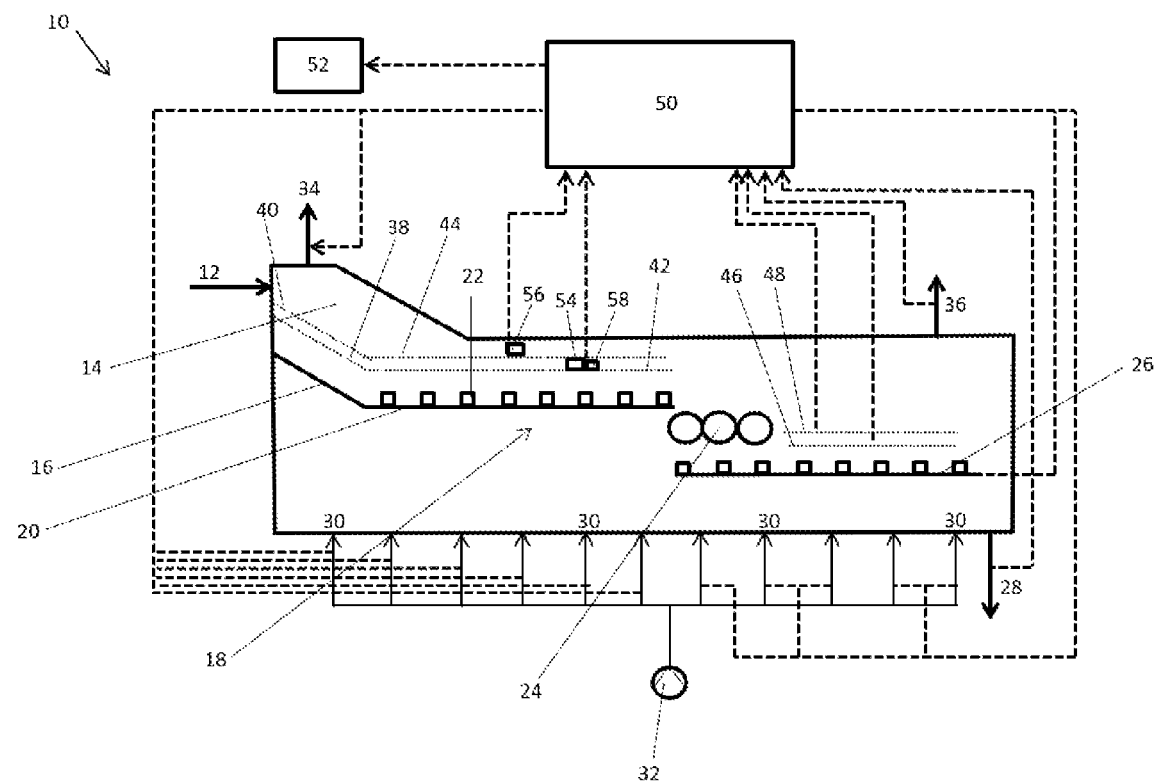

COOLER FOR COOLING CLINKER AND METHOD FOR OPERATING A COOLER FOR COOLING CLINKER

CROSS REFERENCE TO RELATED APPLICATIONS

This application is a U.S. National Stage Entry of International Patent Application Serial Number PCT/EP2019/073868, filed Sep. 6, 2019, which claims priority to German Patent Application No. DE 10 2018 215 348.5, filed Sep. 10, 2018, the entire contents of both of which are incorporated herein by reference.

FIELD

The present disclosure generally relates to coolers for cooling clinker of cement production plants and to methods for operating coolers for cooling clinker.

BACKGROUND

The invention relates to a cooler for cooling clinker, and to a method for operating a cooler for cooling clinker, of a cement production plant.

For cooling the hot bulk material such as, for example cement clinker, it is known for the bulk material to be deposited onto an aeration grate of a cooler that is able to be passed by a flow of cooling gas. The hot bulk material for cooling is subsequently moved from one end of the cooler to the other end and herein passed through by a flow of cooling gas.

Various possibilities are known for transporting the bulk material from the beginning of the cooler to the end of the cooler. In a so-called reciprocating grate cooler the transportation of the bulk material takes place by movable conveyor elements which move in the conveying direction and counter to the conveying direction. The conveyor elements have a thrust edge that transports the material in the conveying direction. A cooler which has a plurality of conveyor elements which are movable in the conveying direction and counter to the conveying direction is known from DE 100 18 142 B4.

Known malfunctions which cause non-uniform and insufficient cooling of the clinker often arise in the operation of the cooler. For example, material streams which have dissimilar grain sizes and have dissimilar temperatures and cooling rates form across the width of the cooler or the height of the clinker layer. The density of the clinker material on the aeration grate of the cooler can also vary across the width or length of the cooler, thus cooling at different rates. A relatively long cooling section is therefore required in order to ensure complete cooling of the clinker.

Thus, a need exists for a cooler and a method for operating a cooler, wherein ideally uniform and efficient cooling of the clinker is achieved.

BRIEF DESCRIPTION OF THE FIGURE

The FIGURE is a schematic sectional view of an example cooler.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

A method for operating a cooler for cooling clinker of a cement production plant according to a first aspect comprises at least the following steps:

conveying the clinker to be cooled along an aeration grate which is passed through by a cross flow of cooling air;

ascertaining a temperature distribution in at least one measuring plane above the aeration grate; and characterized by open-loop/closed-loop controlling at least one operation parameter of conveying rate of the clinker and/or flow rate of the cooling air of the cooler as a function of the ascertained temperature distribution. The temperature is preferably ascertained exclusively in exactly one measuring plane.

The cooler is disposed downstream of a kiln for firing cement clinker, for example, and is preferably disposed below the kiln outlet. The cooler has in particular one entry region which is adjoined by the aeration grate. A stationary entry grate which preferably extends in an oblique manner, i.e. at an angle, in relation to the aeration grate and adjoins the latter is disposed in the entry region, for example. The entry grate is likewise passed by a flow of cooling air. The conveying of the clinker to be cooled along the aeration grate takes place according to the "walking floor principle", for example, wherein the aeration grate comprises a plurality of boards, in particular transportation grates, and at least two boards are simultaneously moved in the conveying direction and not simultaneously moved counter to the conveying direction.

A temperature distribution is in particular to be understood to be a two-dimensional distribution of the temperature in one plane. For example, the temperature distribution is calculated from individual temperature data ascertained in the measuring plane. To this end, the temperature is in particular measured at a plurality of points or lines in the plane, and a distribution of the temperature is calculated across the entire measuring plane or at least part of the measuring plane. A temperature distribution preferably comprises a plurality of temperature values which are measured or calculated, for example, and are to be assigned to a location or a region in the respective measuring plane. The measuring points are preferably uniformly spaced apart from one another and distributed across the entire respective measuring plane. A measuring plane has in particular at least 10, preferably 100, in particular 10,000 measuring points. One temperature measuring installation is in each case disposed at each measuring point, for example. A temperature measuring installation preferably has a transmitter and a receiver, wherein the ascertained temperature is preferably a mean temperature between the transmitter and the receiver. It is likewise conceivable that each temperature value corresponds to a measured value or represents a mean value calculated from a plurality of measurements.

A plurality of temperature measuring installations are preferably disposed in each measuring plane, wherein each temperature measuring installation has a transmitter and a receiver. The temperature measuring installations, in particular the transmitters and receivers, of each measuring plane communicate in each case with one another, for example, such that an in particular mean temperature is ascertained between each transmitter and receiver of a respective measuring plane. In the case of a number of n temperature measuring installations, n*(n−1) measured values are ascertained in the measuring plane, for example. A two-dimensional distribution of the temperature results therefrom, for example. It is likewise conceivable that temperature measuring installations of different measuring planes communicate with one another such that temperature values between two temperature measuring installations of different measuring planes are ascertained. A three-dimensional distribution of the temperature results therefrom.

The temperature distribution is preferably ascertained in at least two or more mutually separated measuring planes within the cooler. The temperature is preferably ascertained in two to eight, in particular four to six, measuring planes. The measuring planes extend within the cooler, in particular above and parallel to the aeration grate. The ascertainment of the temperature distribution in each measuring plane takes place across at least part of the extent of the measuring plane or across the entire measuring plane, and is ascertained by means of at least one temperature measuring installation in each measuring plane. The temperature measuring installations are in each case preferably disposed in one measuring plane. The temperature distribution of the gas, in particular of the cooling gas, rather than the radiation temperature distribution, is preferably ascertained. The measuring plane preferably extends transversely to the flow direction of the cooling gas, in particular parallel to the aeration grate or the entry grate. The measurement of the temperature preferably takes place in the gas flow of the cooling air.

The conveying rate of the clinker and/or the flow rate of the cooling air of the cooler is decreased or increased as a function of the ascertained temperature distribution.

The closed-loop/open-loop controlling of at least one operation parameter of conveying rate of the clinker and/or flow rate of the cooling air of the cooler as a function of the ascertained temperature distribution enables optimal cooling of the clinker. The clinker to be cooled is in particular uniformly cooled, wherein the cooling air and/or the flow rate can be set in an optimal manner so as to implement ideally efficient cooling.

According to a first embodiment, the ascertainment of the temperature distribution takes place simultaneously in at least two measuring planes. The two measuring planes are disposed so as to be mutually parallel, for example. Both measuring planes are in particular disposed above the aeration grate. Simultaneously ascertaining the temperature distribution in at least two measuring planes enables the temperature to be monitored in a plurality of regions within the cooler. For example, the measuring planes are disposed in regions in which a deviation of the temperature from an optimal value arises frequently, or preferably close to an inlet or an outlet for allowing clinker to enter/exit the cooler.

According to a further embodiment, the at least one measuring plane extends transversely to the flow direction of the cooling air. All measuring planes of the cooler preferably extend transversely, preferably orthogonally, to the flow direction of the cooling air. For example, the measuring planes are disposed so as to be mutually parallel and parallel to the aeration grate or the entry grate.

According to a further embodiment, the ascertainment of the temperature distribution takes place acoustically. For example, a temperature measuring installation for ascertaining the temperature comprises a sonic horn, preferably as transmitter and/or receiver. The ascertainment of the temperature distribution takes place by means of acoustic pyrometry, for example. An acoustic signal which is generated by compressed air and preferably has a frequency range between 200 and 3000 Hz is in particular emitted by a transmitter. The runtime of the signal to a receiver is ascertained, and the temperature of the path between the transmitter and the receiver is ascertained therefrom, since the sonic speed in a manner known is a function of the temperature. When a plurality of receivers and transmitters wherein the signal paths intersect are provided, a graphic representation of a temperature distribution of a measuring plane can be ascertained, for example.

According to a further embodiment, the ascertained temperature distribution is compared with the previously ascertained or determined temperature mean value and/or a temperature distribution, and the deviation from this temperature mean value and/or the temperature distribution is ascertained. The temperature mean value is, for example, a mean temperature value across the entire measuring plane that has been calculated from the ascertained temperature distribution. The mean value can also be a previously ascertained mean value of, for example 250° C.-1100° C., preferably 400° C.-800° C., in particular 500° C.-600° C. Each temperature value of the temperature distribution is preferably compared with the temperature mean value and a deviation is ascertained in each case. The conveying rate of the clinker and/or the flow rate of the cooling air of the cooler is increased or decreased when at least one temperature value of the temperature distribution deviates from the previously ascertained or determined temperature mean value, for example.

According to a further embodiment, a region in the measuring plane in which the deviation exceeds a value of approximately +/−25-150° C., preferably +/−50°-100° C., in particular +/−60-80° C., is ascertained. This is that region of the measuring plane in which all temperature values of the temperature distribution exceed a deviation of approximately +/−25-150° C., preferably +/−50°-100° C., in particular +/−60-80° C., from the temperature mean value. A region can also comprise only one point which is assigned to a temperature value that has the deviation described above. For example, a region comprises a plurality of points on the respective measuring plane to which one temperature value having a deviation mentioned above is in each case assigned. This enables a variation of the conveying rate of the clinker and/or the flow rate of the cooling air of the cooler at or close to the region of the respective measuring plane where the temperature difference is excessive. On account thereof, targeted open-loop/closed-loop controlling of the cooling air quantity and the conveying rate is possible exclusively in the regions with an increased temperature differential.

According to a further embodiment, the quantity of cooling air entering the cooler, the rotating speed of a ventilator for generating a cooling airflow, and/or the quantity of cooling air exiting the cooler is controlled in an open-loop/closed-loop as a function of the ascertained temperature distribution. For example, the quantity of cooling air is ascertained by the size of the entry openings through which cooling air enters the cooler. The cooler preferably has a plurality of entry openings, the diameter of the latter being in particular variable. For example, the diameter of at least one entry opening is varied as a function of the ascertained temperature distribution.

According to a further embodiment, the flow rate of the clinker and/or the flow rate of the cooling air is varied when the temperature in a region of the measuring plane exceeds a previously ascertained or determined mean value by approximately +/−25-150° C., preferably +/−50°-100° C., in particular +/−60-80° C.

According to a further embodiment, the flow rate of the clinker is increased when the temperature in a region of the measuring plane exceeds the previously ascertained or determined mean value by approximately 25-150° C., preferably 50°-100° C., in particular 60-80° C.

According to a further embodiment, the flow rate of the cooling air is increased when the temperature in a region of the measuring plane undershoots a previously ascertained or determined mean value by approximately 25-150° C., preferably 50°-100° C., in particular 60-80° C.

According to a further embodiment, the ascertained temperature distribution is compared with a previously ascertained exemplary temperature distribution, and a specific malfunction is identified in the case of a conformance. For example, each malfunction is assigned a specific exemplary temperature distribution which is stored in the open-loop/closed-loop control installation. The open-loop/closed-loop control installation compares the transmitted temperature distributions of the measuring planes with the exemplary temperature distributions and in the case of a conformance of the transmitted temperature distribution to an exemplary temperature distribution identifies a specific malfunction.

The invention also comprises a cooler for cooling clinker, in particular of a cement production plant, having an aeration grate for conveying the clinker in a conveying direction, and at least one ventilator for generating a cooling air flow which passes the aeration grate as a cross flow. At least one measuring plane having in each case at least one temperature measuring installation for ascertaining a temperature distribution in the measuring plane is disposed above the aeration grate. The cooler also has an open-loop/closed-loop control installation which is configured in such a manner that said open-loop/closed-loop control installation in an open loop/closed loop controls the conveying rate of the clinker and/or the flow rate of the cooling airflow as a function of the ascertained temperature distribution. The embodiments and advantages described with reference to the method also apply in analogous manner to the cooler.

According to an embodiment, the cooler comprises at least two measuring planes which comprise in each case at least one temperature measuring installation. According to a further embodiment, the measuring planes are mutually spaced apart in the flow direction of the cooling airflow.

According to a further embodiment, the open-loop/closed-loop control installation is connected to at least one means such that the open-loop/closed-loop control installation in an open loop/closed loop controls the conveying rate of the clinker and/or the flow rate of the cooling air as a function of the temperature distribution ascertained by means of the temperature measuring installation. The means is, for example, a means for varying the size of at least one cooling air inlet such as, for example, a flap. The means is, for example, a drive motor for driving the conveyor elements or conveyor boards of the aeration grate.

According to a further embodiment, the temperature measuring installation is an acoustic sensor.

FIG. 1 shows a cooler 10 for cooling bulk material such as cement clinker, for example. Such a cooler 10 is preferably disposed so as to adjoin a kiln, such as a rotary kiln for firing cement clinker, for example, such that the cement clinker is transported from the kiln exit into the cooler. The cooler 10 has an inlet 12 for allowing the material to be cooled to enter the cooler. The inlet 12 is disposed below a kiln outlet, for example, such that the material to be cooled drops into the cooler 10.

The cooler 10 illustrated in FIG. 1 has an entry region 14 which adjoins the inlet 12. The cooler 10 has an aeration grate 18 which receives the material to be cooled and transports the latter along the extent of the cooler 10. The aeration grate 18 comprises a plurality of grates across which the material is transported and cooled, for example. The aeration grate 18 in the entry region 14 comprised an entry grate 16 onto which the material to be cooled is deposited; for example, the material to be cooled drops from the kiln onto the entry grate 16. The entry grate 16 is disposed obliquely, for example at an angle of 30°-60°, in particular 40°-50°, preferably 45°, in relation to the vertical. The entry grate 16 is in particular disposed so as to be stationary and does not move relative to the other components of the cooler 10. The entry grate is preferably a grate which is able to be passed by a flow of cooling air such that material on the entry grate 16 is cooled by means of a cooling airflow that flows through the grate.

The entry grate 16 is adjoined by a first transportation grate 20 which runs in a substantially horizontal manner and on which the material to be cooled is transported from the entry grate 16. For example, the material slides from the oblique entry grate 16 onto the first transportation grate 20 by virtue of gravity. The first transportation grate 20 in an exemplary manner has a plurality of entrainment elements 22 which are attached to upward-pointing faces of the transportation grate 20. The transportation grate 20 is, for example, a reciprocating conveyor, wherein the entrainment elements 22 are movable relative to the transportation grate 22 and transport the material from the cooler inlet in the conveying direction to the cooler outlet. The entrainment elements 22 extend across the entire length of the transportation grate 20 and are disposed so as to be mutually parallel, for example. In order for the material to be transported along the transportation grate 20, the entrainment elements 22 move according to the "walking floor principle", for example, wherein the entrainment elements are moved back and forth in the conveying direction. The movement of the entrainment elements takes place in such a manner that each entrainment element moves in each case conjointly with at least one neighboring entrainment element in the conveying direction, and moves back in each case in a non-simultaneous manner conjointly with a neighboring entrainment element counter to the conveying direction. This results in the material being transported in the conveying direction.

The transportation grate 20 can also be a reciprocating grate conveyor, wherein the transportation grate 20 has a plurality of parallel grate boards which are movable relative to one another, for example. The grate boards of the reciprocating grate conveyor have entrainment elements 22 that are fixedly attached to the grate boards, for example, or are designed so as to be completely without any entrainment elements 22. In order for the material to be transported, the grate boards are also moved according to the "walking floor principle" described above, for example.

The first transportation grate 20 in the conveying direction has a drop-off end where the material to be cooled drops down from the transportation grate. A comminution installation 24 for comminuting the material exiting the first transportation grate 20 is disposed below the drop-off end of the first transportation grate 20. The comminution installation 24 is, for example, a crusher or a grinding mill which preferably has two or three rollers.

The aeration grate 18 also comprises a second transportation grate 26, for example, which is preferably disposed below the comminution installation 24. The material comminuted by means of the comminution installation 24 drops onto the second transportation grate and is transported in the conveying direction. The second transportation grate 26 corresponds substantially to the first transportation grate 20, for example, wherein the material is likewise transported according to the "walking floor principle". The cooled clinker drops down from the transportation grate 26 at the drop-off end of the second transportation grate 26 that points in the conveying direction and exits the cooler through an outlet 28 which is disposed below the second transportation grate 26, for example.

The cooler 10 below the aeration grate 18 furthermore has a plurality of cooling air inlets 30. The cooling air inlets 30 are in each case connected to a ventilator 32, for example, such that the cooling air is blown into the cooler 10 by means of the ventilator 32. It is likewise conceivable for a plurality of ventilators 32 to be disposed, wherein one group of cooling air inlets 30, or exactly one cooling inlet 30, is in each case connected to the ventilator. The cooler 10 in an exemplary manner has a first air outlet 34 which is disposed above the entry grate 16 such that the cooling air flowing through the entry grate 16 exits the cooler 10 through the first air outlet 34. The cooling air exiting the first air outlet 34 is supplied to the kiln (burner), a pre-heater, and/or a calciner of a cement production plant, for example. The cooler furthermore has a second air outlet 36 which in the conveying direction of the material is disposed at the end of the cooler, preferably above the second transportation grate 26. The cooling air that flows through the second transportation grate 26 exits the cooler 10 in particular through the second air outlet 36.

One or a plurality of measuring planes, in an exemplary manner four measuring planes, for ascertaining a temperature distribution are disposed above the entry grate 16 and the transportation grate 20. A first measuring plane 38 is disposed above and parallel to the entry grate 16. A second measuring plane 40 is disposed above and parallel to the first measuring plane 38. The second measuring plane 40 is preferably disposed so as to be behind the first measuring plane 38 in the flow direction of the cooling air. The first measuring plane 38 and the second measuring plane 40 in an exemplary manner extend in each case across the entire surface of the entry grate 16, wherein it is likewise conceivable that said measuring planes extend only across a sub-region of the surface. A third measuring plane 42 is disposed above and parallel to the first transportation grate 20, wherein a fourth measuring plane 44 is disposed above and parallel to the third measuring plane 42. The fourth measuring plane 44 is preferably disposed behind the third measuring plane 42 in the flow direction of the cooling air. The third measuring plane 42 and the fourth measuring plane 44 preferably extend in each case across the entire surface of the first transportation grate 20, wherein it is likewise conceivable that said measuring planes extend only across a sub-region of the surface. A fifth measuring plane 46 is disposed above and parallel to the second transportation grate 26, wherein a sixth measuring plane 48 is disposed above and parallel to the fifth measuring plane 46. The sixth measuring plane 48 is preferably disposed behind the fifth measuring plane 46 in the flow direction of the cooling air. The fifth measuring plane 46 and the sixth measuring plane 48 preferably extend in each case across the entire surface of the second transportation grate 26, wherein it is likewise conceivable that said measuring planes extend only across a sub-region of the surface. The fifth measuring plane 46 and the sixth measuring plane 48 in an exemplary manner extend only across that sub-region of the second transportation grate 26 that is not disposed below the comminution installation 24. "Below" and "above" in the context described above is in particular to be understood to be the vertical projection.

The cooler 10 in each measuring plane 38-48 has at least one temperature measuring installation or a plurality of temperature measuring installations for ascertaining the temperature in the respective measuring plane (see, e.g., temperature measuring installations 54, 56, and 58). Four temperature measuring installations are in each case attached in an exemplary manner to each measuring plane 38-48. Each measuring plane 38-48 preferably has two to ten, preferably four to six, temperature measuring installations. The temperature measuring installations are preferably attached to the internal wall of the cooler 10 in the respective measuring plane 38-48 and are in particular disposed so as to be uniformly spaced apart from one another. It is likewise conceivable for only two temperature measuring installations to be disposed in each measuring plane 38-48.

The temperature measuring installations are in particular configured for ascertaining a temperature distribution within the measuring plane 38-48. Particularly suitable to this end is the use of an acoustic sensor as the temperature measuring installation. The temperature measuring installations are in particular attached so as to be movable such that the alignment of the respective associated measuring plane 38-48 is adjustable.

The cooler 10 preferably has an open-loop/closed-loop control installation 50 for controlling in an open loop/closed loop the conveying rate of the material to be cooled and/or the flow rate or the air quantity of the cooling air. The open-loop/closed-loop control installation 50 is connected to at least one of the temperature measuring installations such that the latter transmits the ascertained temperature, in particular the ascertained temperature distribution, in the respective measuring plane to the open-loop/closed-loop control installation 50. The open-loop/closed-loop control installation is preferably connected to each temperature measuring installation of the cooler 10. In particular each of the temperature measuring installations of the measuring planes 38-48 transmits the measured temperature data to the open-loop/closed-loop control installation 50. In the FIGURE, this is illustrated by the interrupted lines/arrows between the measuring planes 38-48 and the open-loop/closed-loop control installation 50.

For example, the open-loop/closed-loop control installation 50 is connected to the cooling air inlets 30 in such a manner that said open-loop/closed-loop control installation 50 in an open loop/closed loop controls the quantity of cooling air which flows through the respective cooling air inlet 30. The open-loop/closed-loop control installation 50 is preferably connected to the one or the plurality of ventilators 32 such that the ventilator rotating speed by means of the open-loop/closed-loop control installation 50 is controlled in an open loop/closed loop. The open-loop/closed-loop control installation 50 is in particular connected to the first and/or the second cooling air outlet 34, 36 such that the quantity of cooling air which flows through the first and/or the second cooling air outlet 34, 36 is able to be controlled in an open loop/closed loop by means of the open-loop/closed-loop control installation 50. The open-loop/closed-loop control installation 50 is preferably connected to the aeration grate 18 such that the conveying rate of the material to be cooled, in particular the conveying rate of the first and/or of the second transportation grate 20, 26 is controlled in an open loop/closed loop by means of the open-loop/closed-loop control installation 50. The open-loop/closed-loop control installation 50 is in particular connected to the clinker outlet 28 of the cooler 10 such that the quantity of clinker that exits the cooler is controlled in an open loop/closed loop by means of the open-loop/closed-loop control installation 50. It is likewise conceivable that the open-loop/closed-loop control installation 50 is connected to the cooler inlet 12 such that the quantity of material that is introduced into the cooler 10 is controlled in an open loop/closed loop by means of the open-loop/closed-loop control installation 50. The afore-described variables such as the quantity of cooling air into the cooler 10, the ventilator rotating speed, the quantity of cooling air which flows through the first and/or the second cooling air outlet 34, 36, the conveying rate of the material to be cooled, the quantity of clinker that exits the cooler, and/or the quantity of material that is introduced into the cooler 10 are/is preferably controlled in an open loop/closed loop as a function of the temperature distribution in the respective measuring planes 38-48 as ascertained by means of the temperature measuring installations. The open-loop/closed-loop control installation 50 is in particular connected to the kiln, in particular the rotary kiln, 52 such that the quantity of clinker that exits the kiln 52, for example, or the temperature of the kiln 52, is controlled in an open loop/closed loop as a function of the temperature distribution in the respective measuring planes 38-48 as ascertained by means of the temperature measuring installations. The parameters which are able to be controlled in an open loop/closed loop by means of the open-loop/closed-loop control installation 50 are, for example, the conveying rate of the clinker, the flow rate of the cooling air, the quantity of cooling air entering the cooler 10, the rotating speed of the ventilator for generating the cooling air flow, the quantity of cooling air exiting the cooler, the quantity of clinker that exits the cooler 10, and/or the quantity of clinker that is introduced into the cooler 10.

For open-loop/closed-loop controlling of the mentioned parameters, the open-loop/closed-loop control installation 50 compares the ascertained temperature distribution with a previously ascertained or determined temperature mean value and/or a temperature distribution, for example. The afore-mentioned parameters are varied by means of the open-loop/closed-loop control installation 50 in the case of any deviation from the previously ascertained or determined temperature mean value and/or the temperature distribution.

The open-loop/closed-loop control installation 50 is preferably configured in such a manner that said open-loop/closed-loop control installation 50 identifies specific malfunctions by means of the transmitted temperature distributions. For example, each malfunction is assigned a specific exemplary temperature distribution which is stored in the open-loop/closed-loop control installation 50. The open-loop/closed-loop control installation 50 compares the transmitted temperature distributions of the measuring planes 38-48 with the exemplary temperature distributions and, in the case of a conformance of the transmitted temperature distribution to one of exemplary temperature distributions identifies a specific malfunction. When a specific malfunction is identified, the open-loop/closed-loop control installation 50 in an open loop/closed loop controls at least one or a plurality of the parameters in a previously determined manner.

An example for a malfunction is the occurrence of the "red river", wherein the latter preferably arises on the lateral periphery of the aeration grate, preferably across the entire length or a sub-region of the aeration grate. A red river is understood to be a fluidized fine material which, in particular in the lateral peripheral regions of the cooler, floats on the material to be cooled. This can be traced back to an excessive quantity of fine material flowing from the kiln into the cooler. In the case of a "red river" the fine material moves through the cooler faster than the coarser material to be cooled and is therefore not sufficiently cooled. A "red river" in the cooler is identified, for example, when the temperature in at least one or both lateral peripheral regions of the cooler deviates from an optimal temperature value by at least one previously determined value across the entire extent or only part of the extent of the cooler. The conveying rate of the material on the aeration grate 18 is decreased when the open-loop/closed-loop control installation 50 identifies the "red river" malfunction in particular by a comparison of the temperature distribution with one of the exemplary temperature distributions. In particular, the conveying rate of the first and/or of the second transportation grate 20, 26 is decreased.

A further example for a malfunction is the "flashfall", wherein the ascertained temperature distribution has a deviation from the previously ascertained mean temperature or temperature distribution by at least 40°-60°, preferably at least 50°. The deviation arises over a period of at least 30s, for example. The temperature deviation arises in the first and/or the second measuring plane 38, 40, for example. The flow rate of the cooling air through the cooler is increased when the open-loop/closed-loop control installation 50 identifies such a flashfall. In particular, the ascertained temperature distribution is compared with an exemplary temperature distribution assigned to the flashfall, and the malfunction "flashfall" is identified in the case of a conformance. For example, the rotating speed of the ventilator 32 or of the plurality of ventilators is increased when the malfunction "flashfall" is identified. In particular, the quantity of cooling air through the cooling air inlets 30 in the front region of the cooler 10 is increased, preferably increased to a greater extent than in the regions of the cooler 10 that are to the rear in the conveying direction of the material.

A further example for a malfunction is the "blowout", wherein the ascertained temperature distribution has a deviation from the previously determined mean temperature or temperature distribution by −20° C. to −80° C., preferably −30° C. to −60° C., in particular −50° C. The conveying rate of the clinker is reduced when such a malfunction is identified. In particular, the ascertained temperature distribution is compared with an exemplary temperature distribution assigned to the blowout, and the malfunction "blowout" is identified in the case of a conformance.

A further example for a malfunction is the "snowman", wherein the ascertained temperature distribution, in particular of the first and/or of the second measuring plane 38, 40 above the static entry grate 16, has a deviation from the previously determined mean temperature or temperature distribution by at least −50° C., preferably over a period of at least three hours. In particular, the ascertained temperature distribution is compared with an exemplary temperature distribution assigned to the "snowman", and the malfunction "snowman" is identified in the case of a conformance. When such a malfunction is identified, the flow rate of the cooling air is varied in such a manner that the cooling air outlets 30 below the entry grate 16 are opened and closed at intervals.

For example, a region in the measuring plane 38-48 in which the deviations of the ascertained temperature distribution from the previously ascertained or determined temperature mean value and/or the previously ascertained or determined temperature distribution exceed a value of approximately +/−25-150° C., preferably +/−50°-100° C., in particular +/−60-80° C., is ascertained by means of the open-loop/closed-loop control installation 50. The conveying rate of the clinker and/or the flow rate of the cooling air is subsequently varied only in the ascertained region of the cooler 10. For example, if a deviation of the ascertained temperature distribution from the previously determined mean temperature or the previously determined temperature deviation is ascertained only in the first measuring plane 38, for example, only the conveying rate of the clinker on the first transport grate 20, the flow rate and/or the quantity of cooling air through the cooling air inlets 30 disposed below the entry grate 16 and/or the quantity of cooling air exiting from the cooler through the first cooling air outlet 34 are/is controlled in an open loop/closed loop, for example.

LIST OF REFERENCE SIGNS

10 Cooler
12 Inlet
14 Entry region
16 Entry grate
18 Aeration grate
20 First transportation grate
22 Entrainment element
24 Comminution installation
26 Second transportation grate
28 Outlet
30 Cooling air inlet
32 Ventilator
34 First cooling air outlet
36 Second cooling air outlet
38 First measuring plane
40 Second measuring plane
42 Third measuring plane
44 Fourth measuring plane
46 Fifth measuring plane
48 Sixth measuring plane
50 Open-loop/closed-loop control installation 50
52 Kiln

What is claimed is:

1. A method for operating a cooler for cooling clinker, the method comprising:
conveying the clinker to be cooled along an aeration grate that is passed through by a cross flow of cooling air;
ascertaining a temperature distribution in a first measuring plane above the aeration grate by a first plurality of temperature measuring installations disposed within the first measuring plane and simultaneously in a second measuring plane parallel to and above the first measuring plane by a second plurality of temperature measuring installations disposed within the second measuring plane, wherein each temperature measuring installation of the first and second pluralities of temperature measuring installations includes a respective transmitter and a respective receiver; and
controlling an operation parameter of at least one of a conveying rate of the clinker and a flow rate of the cooling air of the cooler as a function of the temperature distribution.

2. The method of claim 1 wherein the first measuring plane extends transversely to a flow direction of the cooling air.

3. The method of claim 1 wherein ascertaining the temperature distribution occurs acoustically.

4. The method of claim 1 comprising:
comparing the temperature distribution with at least one of a temperature mean value and of a temperature distribution that was previously determined; and
ascertaining a deviation from the at least one of the temperature mean value and of the temperature distribution.

5. The method of claim 4 comprising identifying a region in the first measuring plane where the deviation is in a range including ±25° C. to 150° C.

6. The method of claim 1 comprising controlling as a function of the temperature distribution at least one of:
a quantity of cooling air entering the cooler,
a rotating speed of a ventilator for generating a cooling air flow, and
a quantity of cooling air exiting the cooler.

7. The method of claim 1 comprising varying at least one of a conveying rate of the clinker or a flow rate of the cooling air when a temperature value of the temperature distribution in the first measuring plane deviates from a previously-determined temperature mean value by a range including ±25° C. to 150° C.

8. The method of claim 1 comprising increasing a conveying rate of the clinker when a temperature value of the temperature distribution in the first measuring plane deviates from a previously-determined temperature mean value by ±25° C. to 150° C.

9. The method of claim 1 comprising increasing the flow rate of the cooling air when a temperature in a region of the first measuring plane undershoots a previously-determined temperature mean value by 25° C. to 150° C.

10. The method of claim 1 comprising identifying a malfunction by comparing the temperature distribution to one or more previously-determined temperature distributions for conformance with the one or more previously-determined temperature distributions.

11. A cooler for cooling clinker, the cooler comprising:
an aeration grate for conveying the clinker in a conveying direction;
a ventilator for generating a cooling air flow that passes the aeration grate as a cross flow;
a first measuring plane disposed above the aeration grate, the first measuring plane having a first plurality of temperature measuring installations disposed within the first measuring plane for ascertaining a temperature distribution in the first measuring plane and a second measuring plane parallel to and disposed above the first measuring plane that includes a second plurality of temperature measuring installations disposed within the second measuring plane for simultaneous temperature measurement, wherein each temperature measuring installation of the first and second pluralities of temperature measuring installations includes a respective transmitter and a respective receiver; and
a control installation to control at least one of a conveying rate of the clinker and a flow rate of the cooling air flow as a function of the temperature distribution.

12. The cooler of claim 11 wherein the first and second measuring planes are spaced apart in a flow direction of the cooling air flow.

13. The cooler of claim 11 wherein the control installation is configured to control at least one of the conveying rate of the clinker and the flow rate of the cooling air by way of the first temperature measuring installation.

14. The cooler of claim 11 wherein the first temperature measuring installation comprises an acoustic sensor.

15. The cooler of claim 11, wherein the aeration grate includes a first transportation grate and the cooler further comprises a second transportation grate.

16. The cooler of claim 15, further comprising a third measuring plane above the second transportation grate and a fourth measuring plane parallel to and above the third measuring plane.

17. The cooler of claim 16, further comprising a comminution installation, wherein the second transportation grate is positioned below and offset with respect to the first transportation grate and at least partially below the comminution installation.

\* \* \* \* \*